United States Patent [19]

Trotoir et al.

[11] Patent Number: 4,829,114

[45] Date of Patent: May 9, 1989

[54] COMPOSITION

[75] Inventors: Jean-Paul Trotoir, Waret-la-Chaussee, Belgium; Colin Bath, Bury, United Kingdom

[73] Assignee: Imperial Chemical Industries PLC, London, England

[21] Appl. No.: 114,734

[22] Filed: Oct. 30, 1987

[30] Foreign Application Priority Data

Nov. 11, 1986 [GB] United Kingdom ............... 8626875
Jan. 23, 1987 [GB] United Kingdom ............... 8701514

[51] Int. Cl.$^4$ .......................... C08K 5/17; C08K 5/09
[52] U.S. Cl. .................................. 524/243; 524/247; 524/251; 524/252; 524/583
[58] Field of Search ............... 524/583, 243, 247, 251, 524/252, 245

[56] References Cited

U.S. PATENT DOCUMENTS

| | | | |
|---|---|---|---|
| 3,563,971 | 2/1971 | Wood et al. | 524/583 |
| 4,124,549 | 11/1978 | Hashiudo et al. | 524/583 |
| 4,639,386 | 1/1987 | Akao | 428/35 |
| 4,704,421 | 11/1987 | Teskin | 524/583 |

FOREIGN PATENT DOCUMENTS 0211651 2/1987 European Pat. Off. .

*Primary Examiner*—Lewis T. Jacobs
*Attorney, Agent, or Firm*—Cushman, Darby & Cushman

[57] ABSTRACT

A composition comprises (a) a carboxylic acid compound which contains at least three carbon atoms and (b) an amine such as an ethoxylated amine. The composition may be obtained by conventional powder blending or melt blending techniques. The compositions can be incorporated into an olefin polymer to give a polymer composition which has an increased crystallization temperature and/or improved optical properties.

20 Claims, No Drawings

COMPOSITION

The present invention relates to compositions, more particularly to compositions comprising additive mixtures suitable for incorporation into polymer materials, the production of polymer compositions and shaped articles formed from such compositions.

Olefin polymers are readily available and widely used polymeric materials. The most excessively available olefin polymers are ethylene and propylene polymers, the term "polymer" being used to include copolymers. Propylene polymers have a melting point which is generally higher than that of ethylene polymers and hence propylene polymers are suitable for use at somewhat higher temperatures than ethylene polymers. Ethylene and propylene polymers can be used for packaging but moulded articles formed from these polymers generally show a high percentage of haze and hence are not satisfactory for applications in which good clarity is desirable.

It is known that the addition of nucleating agents, for example sodium benzoate, to olefin polymers provides an increase in the crystallisation temperature, and/or an improvement in the optical properties, of the polymer. Furthermore, the use of nucleating agents can allow a shorter cycle time, and hence better productivity, in an injection moulding process. However, the use of such nucleating agents is often limited due to their high price, for example dibenzylidene sorbitol, or to dispersin problems, for example with sodium benzoate.

We have now found that mixtures of certain readily available materials are effective in increasing the crystallisation temperature, and/or improving the optical properties, of olefin polymers.

According to the present invention there is provided a composition comprising (a) a carboxylic acid compound which contains at least three carbon atoms; and (b) an amine.

The carboxylic acid compound is preferably one containing at least two carboxylic acid groups attached to an optionally substituted saturated aliphatic hydrocarbon group or one containing at least one carboxylic acid group attached to an optically substituted ring system. Carboxylic acids containing at least two carboxylic acid groups attached to an aliphatic hydrocarbon group include glutaric acid, adipic acid, succinic acid, suberic acid, pimelic acid, azelaic acid and sebacic acid. Preferred carboxylic acids of this type contain two carboxylic acid groups and from three to ten carbon atoms. Carboxylic acids containing at least one carboxylic acid group attached to a ring system include monocarboxylic acids such as benzoic acid, toluic acid, and p-tertiary butyl benzoic acid, hydroxycarboxylic acids such as salicylic acid, and dicarboxylic acids such as phthalic acid, terephthalic acid, cyclohexane-1,2-dicarboxylic acid and cyclohexane-1,4-dicarboxylic acid.

The amine which is component (b) may be a diamine or a substituted amine, for example an ethoxylated amine. Thus component (b) may be a compound of general formula I or II:

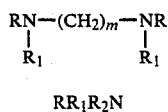

$$RN-(CH_2)_m-NR \qquad I$$
$$\phantom{RN-}|\phantom{(CH_2)_m-}|$$
$$\phantom{RN-}R_1\phantom{(CH_2)_m}R_1$$

$$RR_1R_2N \qquad II$$

wherein:
R is a hydrocarbyl group or a substituted hydrocarbyl group and is preferably a hydrocarbyl group containing at least four carbon atoms;
$R_1$ is a hydrocarbyl group, a substituted hydrocarbyl group or a group $(R_3O)_x(C_2H_4O)_nH$;
$R_2$ is a hydrocarbyl group, a substituted hydrocarbyl group or a group $(R_3O)_x(C_2H_4O)_nH$, and may be the same as, or different from, $R_1$;
$R_3$ is an alkylene group containing 3 to 5 carbon atoms;
m is an integer and has a value of 1 to 10;
n is zero or is an integer which has a value of from 1 to 50; and
x is zero or is an integer which has a value of from 1 to 50.

Useful mixtures have been obtained in which the amine is a compound of formula II wherein at least one of the groups $R_1$ and $R_2$ is a group $(R_3O)_x(C_2H_4O)_nH$ in which the value of n and/or x is from 1 to 50. A mixture of compounds may be used as component (b), for example a mixture of compounds in which the value of at least one of m, n and x differs. The mixture may be of compounds in which the nature of R varies, for example when R is a mixture of alkyl groups. If a mixture of compounds is used, such a mixture may be one of compounds of formula II in which there is present at least one group $(R_3O)_x(C_2H_4O)_nH$ in which group the value of n and/or x varies, and particularly at least one group in which x is zero and the value of n varies.

The group R is preferably an alkyl group and particularly is an alkyl group containing at least 8 carbon atoms. Typically R does not contain more than 20 carbon atoms.

In the compound of formula I, $R_1$ is preferably either a hydrogen atom [when the values of n and x are zero in the group $(R_3O)_x(C_2H_4O)_nH$], or is a methyl group or hydroxyethyl group. The value of m is preferably from 2 to 6.

In the compound of formula II, the groups $R_1$ and $R_2$ are each, independently, either a group R or a group $(R_3O)_x(C_2H_4O)_nH$ in which the value of x is zero and n is 0 to 50. Preferably the groups $R_1$ and $R_2$ are both the same as the group R or at least one of $R_1$ and $R_2$ is a group $(R_3O)_x(C_2H_4O)_nH$ in which the value of n is 1 to 50. Preferred amines are those in which at least one of the groups R, $R_1$ and $R_2$ is an alkyl group containing at least 8 carbon atoms, especially at least 12 carbon atoms. The group $R_3$ is preferably a propylene group. Both n and x can be zero or at least one of n and x has a positive value. The value of n and x preferably does not exceed 20 and especially does not exceed 15. The group $(R_3O)_x(C_2H_4O)_nH$ may be an OH ended alkylene oxide, for example a propylene oxide, group, an OH ended ethylene oxide group or may contain both alkylene oxide and ethylene oxide groups. If n and x both have a positive value, it is generally preferred that (n+x) has a value of 2 to 50, and preferably does not exceed 20 and especially does not exceed 15.

If the acid or amine contains a substituted group, the substituent may be a hydroxy group, one or more halogen atoms, a nitrile group, a hydrocarbyloxy group, a hydrocarbonyl group such as an acyl group, a hydrocarbyloxycarbonyl or a hydrocarbonyloxy group, whereof the hydrocarbyl groups may be further substituted with substituent groups of the foregoing types.

Amines which may be used in the compositions of the present invention include

N,N-bis(hydroxyethyl)alkyl($C_{13}$ to $C_{15}$) amine;
N-methyl-N-hydroxyethyl-alkyl($C_{13}$ to $C_{15}$)amine;
N,N-dimethyl-octadecylamine;
N,N-bis(hydroxyethyl)-octadecylamine;
N-methyl-N,N-bis(coco)amine;
N,N-dimethyl-tallowamine; and
N-tallow-N',N',N'-tris(hydroxyethyl)-1,3-diaminopropane.

The molar proportions of (a) and (b) can be varied widely, for example from 10:1 to 1:10. However, we generally prefer to avoid a large excess of one component relative to the other component and hence we generally prefer that the molar proportions of (a) and (b) are from 10:1 to 1:3 particularly 10:1 to 1:1. If component (a) is a dicarboxylic acid or component (b) is a diamine, the components may be used in essentially stoichiometric proportions, for example one mole of a dicarboxylic acid to two moles of a monoamine.

The composition of the present invention may be incorporated into an olefin polymer.

Thus, as a further aspect of the present invention there is provided a polymer composition which comprises an olefin polymer, a carboxylic acid compound which contains at least three carbon atoms and an amine.

The carboxylic acid compound and the amine are components (a) and (b) of the composition discussed hereinbefore.

In the polymer composition the proportion of the carboxylic acid compound is typically from 0.05 up to 3%, and preferably from 0.1 up to 1%, by weight relative to the polymer, and the proportion of the amine is typically from 0.05 up to 3%, and preferably from 0.1 up to 1.5%, by weight relative to the polymer.

The olefin polymer (which term is used herein to include both homopolymers and copolymers) may be any ethylene homopolymer or copolymer, particularly high density polyethylene or linear low density polyethylene which is a copolymer of ethylene with a higher olefin monomer such as butene-1, hexene-1, octene-1 or 4-methylpentene-1. Alternatively, the olefin polymer may be a propylene homopolymer or copolymer, for example a random copolymer of propylene with up to 8% by weight, relative to the polymer, of ethylene, or a sequential polymer obtained by polymerising propylene in the essential absence of other monomers and thereafter copolymerising a mixture of ethylene and propylene to give a polymer containing from 5 up to 30% by weight of ethylene.

The polymer composition may be obtained by adding the carboxylic acid and the amine separately to the olefin polymer or the acid and the amine may be pre-mixed and then added to the olefin polymer. The acid and the amine when incorporated into an olefin polymer, result in an increase in the crysallisation temperature and/or an improvement in optical properties of the polymer. The acid and amine which are used in the composition of the first aspect of the present invention can react together and we have found that the reaction product is less effective in giving the desired effects when incorporated into an olefin polymer. Accordingly, we prefer to avoid maintaining these compositions at an elevated temperature, for example above 120° C. and especially above 200° C., for a prolonged period of time, for example in excess of 15 minutes.

Some components of the compositions of ethe first aspect of the present invention are either liquids or waxy solids at ambient temperature and are difficult to handle in this form, especially if accurate metering of the components is required. Hence, it may be preferred that the compositions are obtained as a polymer masterbatch containing a higher concentration of the composition than is required in the final polymer composition. The polymer masterbatch may be a mixture obtained by blending, without melting, with a particulate polymer. However, it is generally preferred that the masterbatch has been obtained by blending with molten polymer, and in this case it is particularly preferred that component (a) and component (b) are formed into separate masterbatches to minimise reaction between components (a) and (b). The amount of additive in the masterbatch is dependent on the nature of the particular additive. Typically the masterbatch contains at least 5% by weight of additive but in general the level of additive does not exceed 50% by weight. A convenient level of additive in the masterbatch is 10 to 15% by weight. If components (a) and (b) have been formed into separate masterbatches, these may be pre-mixed in any desired proportion and the mixture may be added to a polymer. Alternatively, the separate materbatches may be added separately to the polymer, without being premixed. We have found that with some amines, the use of a materbatch not only results in easier handling of the material but can also lead to improved colour in the final polymer composition.

If a polymer masterbatch is formed, it will be appreciated that it is desirable that the polymer used to form the masterbatch should be compatible with the polymer used for the polymer composition. Thus, the polymer used for the masterbatch is preferably of the same general type as the polymer used for the polymer composition, for example both polymers are low density polyethylene or are both propylene homopolymers. In general the amount of masterbatch to be used is a minor proportion of the final polymer composition and compatibility may be more readily achieved using such relative proportions of the polymers. Typically the masterbatch is used in an amount of 1 to 10% by weight of the final composition when using a masterbatch containing 10% by weight of the acid and/or amine. Conveniently there is used 1 to 6% by weight of an amine masterbatch containing 10% by weight of amine and 3 to 5% by weight of an acid masterbatch containing 10% by weight of acid. Masterbatches containing other proportions of additive are added in the appropriate amounts in dependence on the level of additive in the masterbatch and the level required in the final polymer composition.

The polymer compositions of the present invention possess an increased crystallisation temperature and/or improved optical properties compared to the original polymer. We have found that if the olefin polymer is a linear low density polyethylene, the incorporation of the carboxylic acid and the amine, in addition to giving improvements in optical properties and/or crystallisation temperature, can also result in improved gloss.

The polymer composition of the present invention may also include other additives which are conventionally added to olefin polymers. Thus, the polymer composition may include other nucleating agents and we have observed further improvements in crystallisation temperature and/or in optical properties in compositions containing finely divided silica in proportions of less than 1% by weight relative to the polymer. By finely divided silica is meant silica having an average particle size of not more than 5 micrometers and especially not more than one micrometer.

The polymer composition also typically includes additives to at least partially inhibit the degradation of the olefin polymer component of the composition. These additives include, inter alia, antioxidants, light stabilisers, antacids, lubricants and, as necessary, copper or metal deactivators. The proportion of each of such additives is typically less than 2% by weight based on the olefin polymer and is general does not exceed 1% by weight based on the olefin polymer. A wide range of additives which provide some inhibition of the degradation of olefin polymers are known and the skilled worker will be able to select appropriate additives in accordance with the particular olefin polymer and the conditions under which it is to be processed and used. Examples of additives which can be used include, inter alia, 1,1,3-tris(2-methyl-4-hydroxy-5-tertiarybutylphenyl)-butane in combination with dilaurylthiodipropionate;
polymerised 1,2-dihydro-2,2,4-trimethylquinoline;
2,6-di-tertiarybutyl-4-methylphenol;
4,4-thio-bis-(6-tertiarybutyl-4-methylphenol);
4,4-thio-bis-(6-tertiarybutyl-4-methylphenol);
oxalic acid bis(benzylidene hydrazide);
N,N'-bis(beta-3,5-ditertiarybutyl-4-hydroxyphenylpropiono)hydrazide;
pentaerythritol-tetra-[3-(3,5-di-tertiary-butyl-4-hydroxyphenyl)propionate];
beta-(3,5-di-tertiary-butyl-4-hydroxyphenyl)-propionic acid-n-octadecyl ester;
2,2-bis[4-(2-(3(3,5-di-tertiary-butyl-4-hydroxyphenyl)-propionyl)oxy)ethoxy)phenyl]propane;
2-(2'-hydroxyphenyl)-benzotriazole derivatives;
2-hydroxybenzophenones such as 4-octoxy-2-hydroxybenzophenone;
sterically hindered amines such as 4-benzoyl-2,2,6,6-tetramethylpiperidine;
tris(2,4-di-tertiary-butylphenyl)phosphite;
calcium stearate;
zinc stearate; and
dehydrotalcite.

The polymeric compositions in accordance with the present invention may be formed into film and other shaped articles by any stable technique, particularly by extrusion or, especially, by injection moulding. We have found that the effectiveness of the composition of a carboxylic acid and an amine can be dependent to some extent on the technique used to obtain the shaped article. Particularly useful effects have been noted when the shaped article has been obtained by injection moulding.

The composition of the present invention, and the polymer composition, may be obtained by blending the components of the composition together using any known, suitable technique as discussed previously herein. The polymer, carboxylic acid and amine may be mixed under conditions in which the polymer is molten, the mixture granulated and the granulated polymer used in a subsequent melt processing stage to give a shaped article, particularly by injection moulding. However, in order to minimise the time during which the acid and amine are mixed at elevated temperature, it is preferred that the acid and amine are added separately, or as a mixture obtained by a solids blending technique, to the polymer at the final stage of producing a shaped polymer article, for example at the injection moulding stage.

The production of compositions and polymer compositions in accordance with the present invention are described in the following illustrative examples, in which some properties of the compositions produced are also given. Unless otherwise stated, percentages in the polymer composition are by weight relative to the polymer component.

EXAMPLES 1 TO 4

Compositions were prepared by blending the components together on a two roll mill, the front roll being at 190° C. and the back roll being at 150° C. The polymer was added first and worked until melting occurred. The additives were then added to the mill and working was continued until the additives were completely homogenised (this required 10 to 15 minutes from the initial addition of the polymer) and there was no evidence of particle agglomeration, as indicated by white specks in the crepe. The milled composition was granulated using a Pallman granulator.

The granules were used to obtain a blown film by means of a Brabender 8266-25D extruder having a 1.9 cm diameter screw having a length:diameter ratio of 25:1. The screw was operated at 45 r.p.m. and the temperature profile in the extruder to the die was 230° C., 240° C., 250° C. and 260° C. (at the die). The polymer was extruded through an annular die gap of diameter 2.64 cm and width of 1 mm. The extruded tube was blown, by air pressure, to a blown film of diameter about 15 cm and having an average film thickness of 60 micrometers.

The crystallisation temperature was determined by cooling a sample of the molten polymer composition at a rate of 20° C. per minute using a Perkin-Elmer Differential Scanning Calorimeter. Percentage haze was determined in accordance with ASTM Test Method D 1003-59T using an "EEL" Spherical Haze Meter.

The results obtained are set out in Table 1, together with the results of comparative examples not in accordance with the present invention.

TABLE 1

| Example or Comp. E. | Polymer (a) | Additives Type (b) | Additives Weight (%) (c) | Crys. temp (d) Start (°C.) | Crys. temp (d) Peak (e) | Haze (%) |
|---|---|---|---|---|---|---|
| A | I | Nil | Nil | 111.5 | 107 | 68 |
| B | I | SiO$_2$ | 0.1 | 119 | 114 | 39 |
| C | I | A | 0.5 | 117 | 108.5 | 57 |
| D | I | AA | 0.3 | 124.5 | 119.5 | 24 |
| E | I | AA | 0.5 | 123.5 | 119.5 | 30 |
| 1 | I | A / AA | 2.0 / 0.5 | 122 | 117.5 | 22 |
| 2 | I | A / AA / SiO$_2$ | 2.0 / 0.5 / 0.1 | 126 | 122 | 22 |
| F | I | GA | 0.3 | 128 | 122.5 | 20 |
| G | II | Nil | Nil | 112 | 106.5 | 61 |
| H | II | A | 2.0 | 107 | 103.5 | 52 |
| I | II | AA | 0.3 | 126 | 121 | 15 |
| J | II | AA | 0.5 | 129 | 125 | 18 |
| 3 | II | A / AA | 2.0 / 0.5 | 125.5 | 121.5 | 26 |
| 4 | II | A / AA / SiO$_2$ | 2.0 / 0.5 / 0.1 | 128.5 | 125 | 16 |

TABLE 1-continued

| Example or Comp. E. | Polymer (a) | Additives Type (b) | Weight (%) (c) | Crys. temp (d) Start (°C.) | Peak (°C.) | Haze (%) (e) |
|---|---|---|---|---|---|---|
| K | II | GA | 0.3 | 129 | 126 | 12 |

Notes to TABLE 1
(a) I is propylene homopolymer 'Propathene' (Registered Trade Mark) grade GWE 26, available from Imperial Chemical Industries PLC. II is propylene homopolymer Novolen grade 1100 LX, available from BASF AG.
(b) $SiO_2$ is a finely divided hydrophobic silica. Sipernat 50S, available from Degussa AG. A is an ethoxylated amine of the type $RN[(C_2H_4O)_nH]_2$ where n has a value of one and R is a mixture of linear and branched aliphatic groups containing from 13 to 15 carbon atoms. AA is adipic acid. GA is glutaric acid.
(c) % weight is weight of additive relative to the polymer.
(d) Crystallisation temperature is as determined by differential scanning calorimetry using a cooling rate of 20° C./minute.
(e) % haze is as determined in accordance with ASTM Test Method D 1003-59T and is measured on a sample of the film formed.

EXAMPLES 5 AND 6

The procedure of Examples 1 to 4 was repeated using two different linear low density polyethylenes and different additives, the processing conditions being the same.

The results obtained are set out in Table 2, together with the results of comparative examples not in accordance with the present invention.

TABLE 2

| Example or Comp. Ex. | Polymer (f) | Additives Type (b) (h) | Weight (%) (c) | Haze (%) (e) | Gloss (%) (i) |
|---|---|---|---|---|---|
| L | III | Nil | Nil | 22 | 41 |
| M | III | LD | 15 | 14 | 66 |
| 5 | III | LD / A \ AA | 1 / 0.1 \ 0.5 | 10 | 78 |
| N | IV | Nil | Nil | 34 | 20 |
| O | IV | LD | 15 | 22 | 63 |
| 6 | IV | LD / A \ AA | 15 / 0.1 \ 0.5 | 13 | 65 |

Notes to Table 2
(b), (c) and (e) are all as defined in Notes to Table 1.
(f) III is a linear low density polyethylene available from Essochem as grade LL 1201. IV is a linear low density polyethylene available from Essochem as grade LL 1417.
(h) LD is low density polyethylene and is available from Essochem as LD 183.
(i) % gloss is as determined on a sample of the film formed using the procedure of British Standard 2782, Method 515B.

EXAMPLES 7 TO 10

Further compositions were produced by the procedure of Examples 1 to 4 and the results are given in Table 3.

TABLE 3

| Example or Comp. Ex. | Polymer (j) | Additives Type (b) | Weight (%) (c) | Crys. temp (d) Start (°C.) | Peak (°C.) | Haze (%) (e) |
|---|---|---|---|---|---|---|
| P | V | Nil | Nil | 110.5 | 106 | 67 |
| Q | V | A | 2.0 | 113 | 106.5 | 46 |
| 7 | V | A / AA | 0.1 / 0.5 | 120.5 | 114 | 43 |
| 8 | V | A / AA | 2.0 / 0.5 | 118.5 | 113.5 | 38 |
| R | VI | Nil | Nil | 113 | 106.5 | 78 |
| S | VI | A | 2.0 | 112.5 | 106.5 | 72 |
| 9 | VI | A / AA | 0.1 / 0.5 | 127.5 | 122 | 69 |
| 10 | VI | A / AA | 2.0 / | 127 | 124.5 | 69 |

TABLE 3-continued

| Example or Comp. Ex. | Polymer (j) | Additives Type (b) | Weight (%) (c) | Crys. temp (d) Start (°C.) | Peak (°C.) | Haze (%) (e) |
|---|---|---|---|---|---|---|
| | | AA | 0.5 | | | |

Notes to Table 3
(b), (c), (d) and (e) are all as defined in Notes to Table 1.
(j) V is propylene homopolymer, 'Propathene' (Registered Trade Mark) grade GWM 22, available from Imperial Chemical Industries PLC. VI is propylene copolymer, 'Propathene' (Registered Trade Mark) grade GWM 101, available from Imperial Chemical Industries PLC.

EXAMPLES 11 TO 18

Further compositions were prepared and tested as follows.

The additives were mixed with particulate polymer by tumble blending and extruding the power blend using a Betol extruder having a 25 mm diameter screw with a cavity transfer mixer. The temperature profile in the extruder was 190° C. up to 220° C., dropping to 205° C. at the die. The extruded lace was passed through a water bath, dried and then granulated.

The products obtained were then formed into discs of 8.9 cm diameter and 1.6 mm thickness by injection moulding the granules using a Boy 30M injection moulding machine operating at 240° C. and with a mould temperature of 50° C. On ejection from the mould, the moulded discs were allowed to cool naturally.

Haze measurements were effected on the injection moulded discs using a Gardner Hazemeter.

The polymer used was a random copolymer of propylene and ethylene containing about 2.6% weight of ethylene and available as 'Propathene' (Registered Trade Mark) grade PXC 22406 from Imperial Chemical Industries PLC.

The results obtained are set out in Table 4, together with the results of comparative examples not in accordance with the present invention.

TABLE 4

| Example or Comp. Ex. | Additives Type (b) (k) | Weight (%) (c) | Cryst. temp. peak (°C.) (l) | Haze (%) (m) |
|---|---|---|---|---|
| T | Nil | Nil | 104.5 | 71 |
| U | A | 0.5 | ND | 88 |
| V | A | 1.0 | ND | 84 |
| W | TBA | 0.35 | 124 | 37 |
| 11 | TBA / A | 0.35 / 0.54 | 126 | 20.5 |
| X | BA | 0.35 | 124 | 67 |
| 12 | BA / A | 0.35 / 0.78 | 125.5 | 27 |
| Y | AA | 0.35 | 123 | 58 |
| 13 | AA / A | 0.35 / 0.66 | 123.5 | 44 |
| 14 | AA / A | 0.35 / 1.31 | 123.5 | 41 |
| Z | C12 | 0.35 | 115 | 83 |
| 15 | C12 / A | 0.35 / 0.56 | 120.5 | 45 |
| 16 | C12 / A | 0.35 / 1.11 | 120.5 | 45 |
| 17 | C14 / A | 0.35 / 0.56 | 121 | 49 |
| 18 | C14 | 0.35 | | |

TABLE 4-continued

| Example or Comp. Ex. | Additives Type (b) (k) | Additives Weight (%) (c) | Cryst. temp. peak (°C.) (l) | Haze (%) (m) |
|---|---|---|---|---|
| | A | 1.11 | 121.5 | 47 |

Notes to Table 4
(b) and (c) are both as defined in Notes to Table 1.
(k) TBA is p-tertiarybutylbenzoic acid. BA is benzoic acid. C12 is cyclohexane-1,2-dicarboxylic acid. C14 is cyclohexane-1,4-dicarboxylic acid.
(l) As determined by differential scanning colorimetry and is the temperature of the highest rate of crystallisation on cooling from the melt at 20° C./minute.
(m) % haze is determined in accordance with ASTM Test Method D 1003-59T using a Gardner Hazemeter and is measured on an injection moulded disc.
ND means Not Determined.

EXAMPLES 19 TO 25

The procedure described for Examples 11 to 18 was repeated with the exception that the polymer used was a different random copolymer containing about 3% weight of ethylene and available as 'Propathene' (Registered Trade Mark) grade PXC 22265 from Imperial Chemical Industries PLC.

The results obtained are set out in Table 5, together with the results of comparative examples not in accordance with the present invention.

TABLE 5

| Example or Comp. Ex. | Additives Type (b) (k) (n) | Additives Weight (%) (c) | Cryst. temp. peak (°C.) (l) | Haze (%) (m) |
|---|---|---|---|---|
| AA | Nil | Nil | 105 | 58 |
| AB | SA | 0.35 | 121 | 38 |
| 19 | SA / A | 0.35 / 0.89 | 123 | 25 |
| AC | GA | 0.35 | 122 | 35 |
| 20 | GA / A | 0.35 / 0.8 | 123 | 29 |
| AD | AA | 0.35 | 121 | 35 |
| 21 | AA / A | 0.35 / 0.72 | 122 | 30 |
| AE | SUA | 0.35 | ND | 39 |
| 22 | SUA / A | 0.35 / 0.60 | ND | 34 |
| AF | BA | 0.35 | 123 | 56 |
| 23 | BA / A | 0.35 / 0.86 | 123 | 46 |
| AG | TA | 0.35 | ND | 49 |
| 24 | TA / A | 0.35 / 0.77 | ND | 39 |
| AH | TBA | 0.35 | 121 | 34 |
| 25 | TBA / A | 0.35 / 0.59 | 124 | 33 |

Notes to Table 5
(b) and (c) are both as defined in Notes to Table 1.
(k), (l) and (m) are all as defined in Notes to Table 4.
(n) SA is succinic acid. SUA is suberic acid. TA is toluic acid.
ND means Not Determined.

EXAMPLES 26 TO 28

The procedure described for Examples 11 to 18 was repeated with the exception that the polymer used was polymer I as defined in Note (a) in Notes to Table 1.

The results obtained are set out in Table 6.

TABLE 6

| Example or Comp. Ex. | Additives Type (b) (k) (n) | Additives Weight (%) (c) | Cryst. temp. peak (°C.) (l) | Haze (%) (m) |
|---|---|---|---|---|
| AI | Nil | Nil | 116 | 77 |
| AJ | GA | 0.35 | 132 | 52 |
| 26 | GA / A | 0.35 / 0.8 | 133 | 48 |
| AK | SA | 0.35 | 132 | 54 |
| 27 | SA / A | 0.35 / 0.89 | 135 | 41 |
| AL | BA | 0.35 | 133 | 69 |
| 28 | BA / A | 0.35 / 0.86 | 135 | 47 |

Notes to Table 6
(b) and (c) are both as defined in Notes to Table 1.
(k), (l) and (m) are all as defined in Notes to Table 4.
(n) is as defined in Notes to Table 5

EXAMPLES 29 TO 36

The procedure described for Examples 11 to 18 was repeated using different amines and the random copolymer used in Examples 19 to 25.

The results obtained are set out in Table 7.

TABLE 7

| Example or Comp. Ex. | Additives Type (b) (k) (n) (o) | Additives Weight (%) (c) | Haze (%) (m) | Relative Clarity (p) |
|---|---|---|---|---|
| AM | Nil | Nil | 76 | 37 |
| AN | MHA | 0.9 | 71 | 35 |
| 29 | AA / MHA | 0.35 / 0.9 | 31 | 150 |
| AO | AA | 0.35 | 43 | 107 |
| AP | SA | 0.35 | 42 | 115 |
| 30 | SA / MHA | 0.35 / 0.9 | 28 | 165 |
| AQ | GA | 0.35 | 44 | 107 |
| 31 | GA / MHA | 0.35 / 0.9 | 29 | 160 |
| AR | DOA | 0.35 | 66 | 35 |
| 32 | GA / DOA | 0.35 / 0.5 | 28 | 165 |
| AS | MCA | 0.5 | 65 | 32 |
| 33 | GA / MCA | 0.35 / 0.5 | 30 | 175 |
| 34 | GA / MTA | 0.35 / 0.5 | 27 | 175 |
| AT | THD | 0.5 | 62 | 37 |
| 35 | GA / THD | 0.35 / 0.5 | 29 | 165 |
| 36 | GA | 0.35 | 29 | 165 |

TABLE 7-continued

| Example or Comp. Ex. | Additives Type (b) (k) (n) (o) | Weight (%) (c) | Haze (%) (m) | Relative Clarity (p) |
|---|---|---|---|---|
|  | A | 0.5 |  |  |

Notes to Table 7
(b) and (c) are both as defined in Notes to Table 1.
(k) and (m) are both as defined in Notes to Table 4.
(n) is as defined in Notes to Table 5.
(o) HMA is an ethoxylated amine of the type $RR_1N(C_2H_4O)_nH$ where $R_1$ is methyl, n has a value of one and R is a mixture of linear and branched aliphatic groups containing from 13 to 15 carbon atoms. DOA is an amine of the type $RR_1R_2N$ where R is an octadecyl group and $R_1$ and $R_2$ are both methyl. MCA is N—methyl-N,N—bis(coco)amine. MTA is N,N—dimethyl-tallowamine.THD is N—tallow-N,N',N'—tris(hydroxyethyl)-1,3-diaminopropane.
(p) Relative clarity is a comparison of the clarity of an injection moulded disc of the polymer compared to a standard. The apparatus consists of a light cabinet with a grid marked on the surface. 82.55 mm (3.25 inches) above the top of the light cabinet is a flat support having a slit cut in it through which the grid is visible. The stand is surrounded by an enclosure with darkened interior surfaces. Two reference discs are stacked together and placed over the slit to almost totally obscure the image of the grid as viewed through this pile of two discs. The test specimens (injection moulded discs obtained as described in Examples 11 to 22) are stacked over the slit, adjacent to the reference discs, further discs being added to the stack until the image of the grid viewed through the test specimens is almost totally obscured and corresponds essentially with the image seen through the reference discs. If exact correspondence is not achieved, an estimate of part discs is made. The relative clarity is expressed as the number of discs in the stack multiplied by 10, that is a relative clarity of 100 corresponds to a stack of 10 discs.

EXAMPLES 37 TO 43

Masterbatch compositions were prepared using either an acid or an amine.

The masterbatches were prepared using the random propylene copolymer of Examples 19 to 25 and contained either 5% by weight of additive (adipic acid or glutaric acid) or 10% by weight of additive (succinic acid or the ethoxylated amine $RN(C_2H_4OH)_2$ where R is a mixture of linear and branched aliphatic groups containing from 13 to 15 carbon atoms). The masterbatches were prepared on a Polymix 150 type two roll mill (available from Schwabenthan) with the front roll at 190° C. and the rear roll at 150° C. The molten polymer was granulated using a Pallman type PS/2 granulator.

Portions of the masterbatches thus obtained were added to a further quantity of the same random propylene copolymer in amounts to give the desired final level of acid, or acids, and amine, as set out in Table 8. The masterbatches were tumble blended with the polymer and the mixture thus obtained was extruded, granulated and finally injection moulded as in Examples 11 to 18. Injection moulded samples were also prepared by tumble blending masterbatches and polymer and injection moulding the mixture with no extrusion and granulating stages.

The compositions produced and the results obtained are set out in Table 8.

TABLE 8

| Example or Comp. Ex. | Additives Type (b) (k) (n) (q) | Weight (%) (c) | Relative Clarity (p) (r) |
|---|---|---|---|
| 37 | AA | 0.30 | 127 |
|  | SA | 0.085 |  |
|  | A | 0.15 |  |
| 38 | AA | 0.30 | 145* |
|  | SA | 0.085 |  |
|  | A | 0.15 |  |
| 39 | AA* | 0.30 | 137 |
|  | SA* | 0.085 |  |
|  | A | 0.15 |  |
| 40 | AA* | 0.30 | 165* |
|  | SA* | 0.085 |  |
|  | A | 0.15 |  |

TABLE 8-continued

| Example or Comp. Ex. | Additives Type (b) (k) (n) (q) | Weight (%) (c) | Relative Clarity (p) (r) |
|---|---|---|---|
| AU | AA | 0.30 | 105 |
|  | SA | 0.085 |  |
| 41 | AA | 0.30 | 122 |
|  | A | 0.15 |  |
| AV | AA | 0.30 | 102 |
| AW | GA | 0.35 | 130 |
| 42 | GA | 0.35 | 145 |
|  | A | 0.15 |  |
| 43 | GA | 0.35 | 160 |
|  | A | 0.50 |  |

Notes to Table 8
(b) and (c) are both as defined in Notes to Table 1.
(k) is as defined in Notes to Table 4.
(n) is as defined in Notes to Table 5.
(p) is as defined in Notes to Table 7.
(q) *These components were added as powders and had not been preformed into a masterbatch.
(r) *These results were obtained using moulded discs obtained by tumble blending polymer and additives (either as masterbatch or powder) and injection moulding the blended mixture without prior extrusion and granulation stages.

EXAMPLES 44 TO 49

The procedure described for Examples 11 to 18 was repeated using various mixtures of acids and amines and also various preformed reaction products of the acids and amines.

The materials used, and the results obtained, are set out in Table 9.

TABLE 9

| Example or Comp. Ex. | Additives Type (b) (o) (s) | Weight (%) (c) | Haze (%) (m) | Relative Clarity (p) |
|---|---|---|---|---|
| AX | Nil | Nil | 76 | 20 |
| 44 | AA | 0.35 | 48 | 90 |
|  | HMA | 0.70 |  |  |
| 45 | AA | 0.35 | 46 | 97 |
|  | HMA | 0.90 |  |  |
| AY | RP 1 | 1.00 | 73 | 42 |
| AA | RP 2 | 1.65 | 78 | 25 |
| BA | RP 3 | 1.87 | 74 | 25 |
| BB | RP 4 | 1.12 | 70 | 27 |
| BC | RP 5 | 0.72 | 64 | 55 |
| 46 | AA | 0.35 | ND | 120 |
|  | A | 0.50 |  |  |
| 47 | AA | 0.35 | ND | 125 |
|  | A | 0.70 |  |  |
| 48 | AA | 0.35 | ND | 125 |
|  | A | 0.90 |  |  |
| 49 | AA | 0.35 | ND | 130 |

TABLE 9-continued

| Example or Comp. Ex. | Type (b) (o) (s) | Additives Weight (%) (c) | Haze (%) (m) | Relative Clarity (p) |
|---|---|---|---|---|
| | A | 1.8 | | |

Notes to Table 9
(b) and (c) are both as defined in Notes to Table 1.
(m) is as defined in Notes to Table 4.
(o) and (p) are both as defined in Notes to Table 7.
(s) Each RP is a reaction product of an adipic acid and an amine obtained by stirring the acid and amine together, heating the mixture, under nitrogen, to 240° C. and maintaining at 240° C. for two hours. Reaction appeared to proceed quickly and to be essentially complete in 30 minutes.
RP 1 is the reaction product of AA and HMA in a molar ratio of 1:1.
RP 2 is the reaction product of AA and HMA in a molar ratio of 1:2.
RP 3 is the reaction product of AA and A in a molar ratio of 1:2.
RP 4 is the reaction product of AA and A in a molar ratio of 1:1.
RP 5 is the reaction product of AA and A in a molar ratio of 2:1.
Each RP material was used in an amount corresponding to 0.35% by weight of adipic acid. The products obtained were esters and in the case of RP 1 some amide was also found to be present but amide was not detected in the other products.

We claim:

1. A polymer composition comprising an olefin polymer and a composition comprising
   (a) a carboxylic acid compound which contains at least three carbon atoms and which contains at least two carboxylic acid groups attached to an optionally substituted saturated aliphatic hydrocarbon group or which contains at least one carboxylic acid attached to an optionally substituted ring system; and
   (b) an amine of the general formula I or II

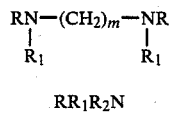

wherein
R is a hydrocarbyl group or a substituted hydrocarbyl group;
$R_1$ is a hydrocarbyl group, a substituted hydrocarbyl group or a group $(R_3O)_x(C_2H_4O)_nH$;
$R_2$ is a hydrocarbyl group, a substituted hydrocarbyl group or a group $(R_3O)_x(C_2H_4O)_nH$, and may be the same as, or different from, $R_1$;
$R_3$ is an alkylene group containing 3 to 5 carbon atoms;
m is an integer and has a value of 1 to 10;
n is zero or is an integer which has a value of from 1 to 50; and
x is zero or is an integer which has a value from 1 to 50;
and the compositions of (a) and (b) is from 0.05% up to 50%, by weight relative to the polymer.

2. The polymer composition of claim 1 wherein (a) is selected from glutaric acid, adipic acid, succinic acid, suberic acid, pimelic acid, azelaic acid or sebacic acid.

3. The polymer composition of claim 1 wherein (a) is a carboxylic acid containing from three to ten carbon atoms and two carboxylic acid groups attached to a saturated aliphatic hydrocarbon group.

4. The polymer composition of claim 1 wherein (a) contains at least one carboxylic acid group attached to a ring system and is selected from benzoic acid, toluic acid, p-tertiary-butylbenzoic acid, salicylic acid, phthalic acid, terephthalic acid, cyclohexane-1,2-dicarboxylic acid and cyclohexane-1,4-dicarboxylic acid.

5. The polymer composition of claim 1 wherein (b) is an amine in which the group R contains at least four carbon atoms.

6. The polymer composition of claim 5 wherein R is an alkyl group containing at least 8, and not more than 20, carbon atoms.

7. The polymer composition of claim 1 wherein (b) is a mixture of compounds.

8. The polymer composition of claim 7 wherein the mixture of compounds is one in which the nature of R varies.

9. The polymer composition of claim 1 wherein (b) is a compound of formula I and $R_1$ is a methyl group or a hydroxyethyl group.

10. The polymer composition of claim 1 wherein (b) is a compound of formula II in which the value of m is from 2 to 6.

11. The polymer composition of claim 1 wherein (b) is a compound of formula II in which R contains at least four carbon atoms, and $R_1$ and $R_2$ are each, independently, either a group R or a group $(R_3O)_x(C_2H_4O)_nH$ in which the value of x is zero and n is 0 to 50.

12. The polymer composition of claim 11 wherein $R_1$ and $R_2$ are both the same as the group R or at least one of $R_1$ and $R_2$ is a group $(R_3O)_x(C_2H_4O)_nH$ in which the value of n is 0 to 50.

13. The polymer composition of claim 1 wherein (b) is
N,N-bis(hydroxyethyl)alkyl($C_{13}$ to $C_{15}$)amine;
N-methyl-N-hydroxyethyl-alkyl($C_{13}$ to $C_{15}$)amine;
N,N-dimethyl-octadecylamine;
N,N-bis(hydroxyethyl)octadecylamine;
N-methyl-N,N-bis(coco)amine;
N,N-dimethyl-tallowamine; and
N-tallow-N',N'-tris(hydroxyethyl)-1,3-diaminopropane.

14. The polymer composition of claim 1 wherein the molar proportion of (a) and (b) are in the range from 10:1 to 1:10.

15. The polymer composition of claim 1 wherein the proportion of (a) is from 0.05 up to 3% by weight of the polymer, and the proportion of (b) is from 0.05 up to 3% by weight of the polymer.

16. A shaped article obtained by injection moulding the polymer composition of claim 1.

17. A process for the production of a polymer composition which comprises blending an olefin polymer with (a) a carboxylic acid compound which contains at least three carbon atoms and which contains at least two carboxylic acid groups attached to an optionally substituted saturated aliphatic hydrocarbon group or which contains at least one carboxylic acid group attached to an optionally substituted ring system; and with (b) an amine of the general formula I or II

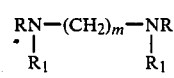

wherein
R is a hydrocarbyl group or a substituted hydrocarbyl group;
$R_1$ is a hydrocarbyl group, a substituted hydrocarbyl group or a group $(R_3O)_x(C_2H_4O)_nH$;

$R_2$ is a hydrocarbyl group, a substituted hydrocarbyl group or a group $(R_3O)_x(C_2H_4O)_nH$, and may be the same as, or different from, $R_1$;

$R_3$ is an alkylene group containing 3 to 5 carbon atoms;

m is an integer and has a value of 1 to 10;

n is zero or is an integer which has a value of from 1 to 50; and x is zero or is an integer which has a value from 1 to 50.

18. The process of claim 17 wherein the acid and amine are mixed with the polymer under conditions to minimise the time during which the acid and amine are together at elevated temperature.

19. The process of claim 18 wherein the acid and the amine are blended separately with molten polymer to form separate masterbatches which are then added to a polymer.

20. The process of claim 18 wherein the acid and amine are added separately to the polymer during an injection moulding stage.

* * * * *